Nov. 16, 1943.　　　T. M. THOMAS　　　2,334,455
DISK HARROW
Filed Sept. 4, 1941　　　2 Sheets-Sheet 1

INVENTOR
Thomas M. Thomas
ATTORNEYS

Nov. 16, 1943. T. M. THOMAS 2,334,455
DISK HARROW
Filed Sept. 4, 1941 2 Sheets-Sheet 2
FIG. 2
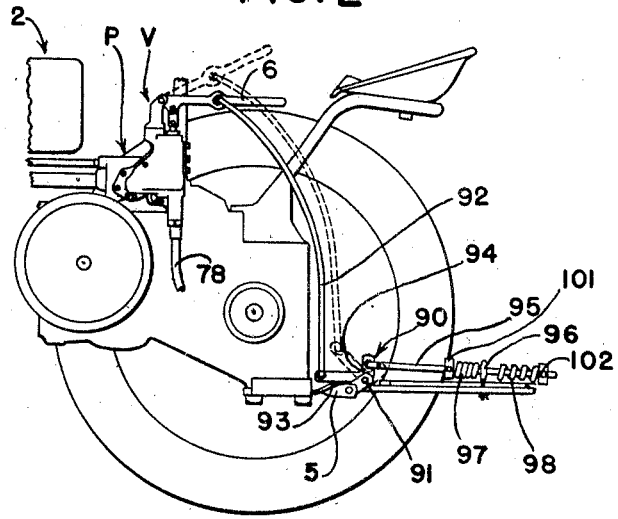
FIG. 4
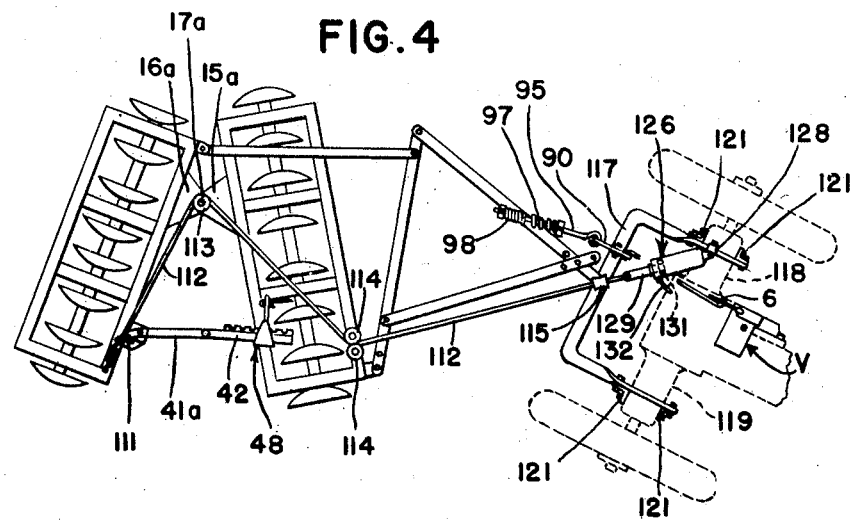
INVENTOR
Thomas M. Thomas
BY 
ATTORNEYS Patented Nov. 16, 1943

2,334,455

UNITED STATES PATENT OFFICE 2,334,455

DISK HARROW

Thomas M. Thomas, Huntington Park, Calif., assignor to Killefer Manufacturing Corporation, Los Angeles, Calif., a corporation of California Application September 4, 1941, Serial No. 409,459

17 Claims. (Cl. 55—83)

The present invention relates generally to agricultural implements and more particularly to disk harrows.

The object and general nature of the present invention is the provision of a propelling vehicle and a propelled vehicle, with means responsive to turning of one relative to the other for establishing a flow of power from propelling vehicle to the propelled vehicle. More specifically, it is a feature of this invention to provide a disk harrow having power operated de-angling means responsive to the turning of the tractor, or other source of power, relative to the harrow for reducing the angle of the disk gangs of the harrow when making a turn. Further, it is a feature of this invention to provide power operated means for changing the angle of the disk gangs when the tractor or other source of power turns a predetermined amount relative to the harrow. More specifically, it is a feature of this invention to provide a hydraulic cylinder and piston unit for changing the angle of the disk gangs, with means responsive to the turning of the tractor or other source of power relative to the harrow for operating valve means or other mechanism controlling the operation of the hydraulic cylinder and piston unit.

It is also a feature of this invention to provide a disk harrow of the offset type with a hydraulic cylinder and piston unit arranged to unlock the angle control means of the harrow and positively move the disk gangs into a de-angled relation in response to the turning of the tractor or other source of power relative to the harrow.

These and other objects and advantages of the present invention will be apparent to those skilled in the art after a consideration of the following detailed description of the preferred construction, taken in conjunction with the accompanying drawings.

In the drawings:

Figure 2 is a fragmentary side view, showing the right turn control for the hydraulic valve unit;

Figure 3 is a fragmentary sectional view taken generally along a line 3—3 of Figure 1, showing the pivotal mounting of the angle control latch;

Figure 4 is a view similar to Figure 1, showing a modified form of construction; and Figure 5 is a fragmentary plan view, similar to Figure 1, showing the de-angled position of the gangs.

Figure 1:
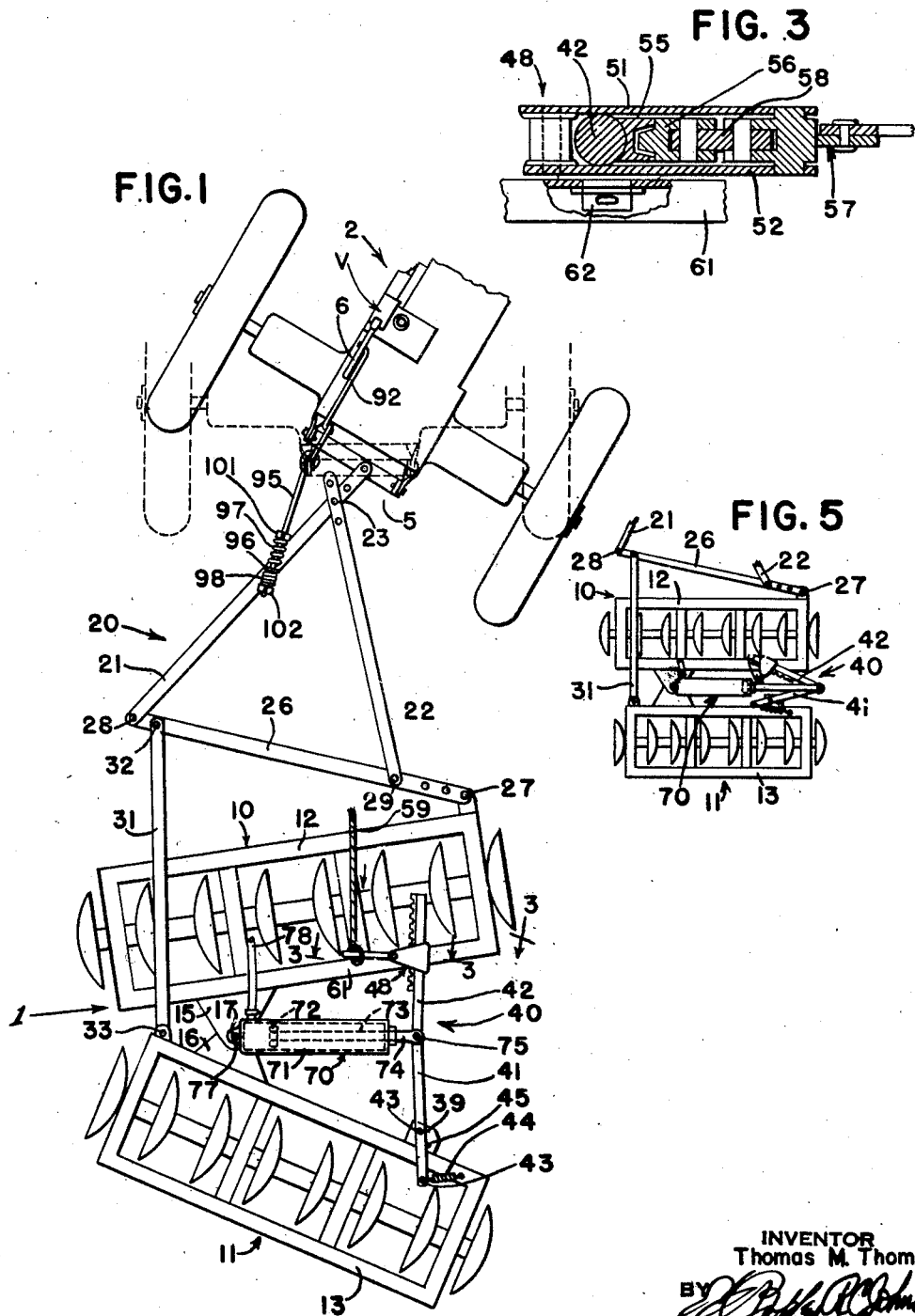
Figure 1 is a plan view of a tractor propelled disk harrow in which the principles of the present invention have been incorporated.

Referring now more particularly to Figures 1–3, the reference numeral 1 indicates in its entirety a farm tool in the form of an offset disk harrow and the reference numeral 2 indicates a tractor for propelling the disk harrow. The tractor 2 is provided with a source of hydraulic pressure, such as a pump P (Figure 2) driven from the tractor governor shaft, which normally rotates at constant speed, and controllable connections, including valve mechanism V and suitable conduits to be described later, for directing the hydraulic fluid to a point of utilization and controlling its return therefrom to a sump or reservoir which is incorporated in the valve mechanism V. The particular details of this unit do not per se form a part of the present invention, the same being disclosed and claimed in the co-pending application of Jay D. Johnson, Serial No. 398,539, filed June 18, 1941, to which reference may be had if necessary. So far as the present invention is concerned, any suitable form of hydraulic pressure and controlling mechanism therefor may be employed if desired. The tractor 2 is provided with a drawbar 5 and the valve mechanism V is operated by a valve lever 6 which, when moved into its upper position (dotted lines, Figure 2) causes fluid to be directed rearwardly to a point of utilization, movement of the valve to its lowered position (full lines, Figure 2) providing for the return of the fluid back to the mechanism V.

The disk harrow 1 chosen to illustrate the principles of the present invention is of the single tandem or offset type, embodying a front gang of disks 10 and a rear gang of disks 11. The gangs of disks are mounted for rotation in a gang frame, the front frame being indicated by the reference numeral 12 and the rear frame by the reference numeral 13. The frames 12 and 13 carry brackets 15 and 16 which are apertured to receive a pin 17 by which the two gangs are pivotally connected together for relative angular movement in a horizontal plane into and out of angled or operating positions. The harrow 1 is connected to the tractor 2 by a hitch construction indicated in its entirety by the reference numeral 20 and which includes hitch bars 21 and 22 which are pivotally connected by a pivot pin 23. Either or both of these bars may be made adjustable in length, if desired, and the bar 21 may be provided with a plurality of openings to receive the pivot pin 23 at any one of a number of different positions. A transverse bar 26 is pivotally connected, as at 27, to the right end of the front gang frame 12 and is apertured to receive pivot pins 28 and 29 by which the rear ends of the hitch bars 21 and 22 are connected thereto. An angling control bar 31 is pivotally connected, as at 32, to the left end of the transverse bar 26 and extends rearwardly beyond the front gang 10 and is pivotally connected, as at 33, to the left end of the rear gang frame 13. The particular details of the hitch or draft device 20 do not per se form a part of the present invention, being quite similar to that disclosed in the patent to Mitchell, 2,201,240, dated May 21, 1940, to which reference may be had if desired.

Figure 1 shows the gangs 10 and 11 in angled or operating position, and in order to hold or lock the gangs in this position and control the de-angling thereof, I provide locking and control means, indicated in its entirety by the reference numeral 40, which includes a pair of toggle links 41 and 42. The toggle link 41 is connected by a pivot pin 43 to a bracket 39 on the right end portion of the rear gang frame 13. A spring 44 is connected between the gang frame 13 and the toggle link 41 and serves to urge the latter for movement up against a stop member 45. The latter member defines the over-center position of the toggle links 41 and 42 whereby the links serve to hold or lock the gangs in an angled position. The front toggle link 42 is connected by a latch mechanism 48 to the front gang frame 12, the latch mechanism 48 being pivoted to the frame 12 to accommodate generally lateral swinging movement of the toggle link 42. The particular details of the latch mechanism 48 do not per se form a part of the present invention, being substantially like the latch shown in the patent to Mitchell et al., 2,169,471, dated August 15, 1939. Briefly, the latch mechanism 48 comprises a pair of plates 51 and 52 suitably connected together to receive the forward end of the front toggle link 42. The front end of the toggle link 42 is provided with a rack 55 with which a latch pawl 56 is adapted to cooperate. The latch pawl 56 is pivoted between the plates 51 and 52 and is controlled by a pivoted arm 57 that is connected by a link 58 to the pawl 56. A rope or other flexible connection 59 is connected with the outer end of the controlling arm 57 and extends forwardly to the tractor 2 to permit the operator to release the pawl 56 from the rack 55 whereby to permit movement of one gang relative to the other so as to adjust the operating or angled position thereof, as may be desired. The frame of the latch, including the plates 51 and 52, is pivoted to the rear frame bar 61 of the front gang frame 12 by means of a stud 62 that is extended through an opening in the horizontal flange of the angle 61.

The angle control toggle links 41 and 42 are arranged to be moved into an angled or collapsed position by a power unit 70 for the purpose of de-angling the gangs. The power unit 70 includes a hydraulic cylinder 71 within which a piston 72 operates. The latter is connected by a piston rod 73 to a yoke 74, and a pivot pin 75 connects the yoke to the inner ends of the toggle links 41 and 42. The cylinder 71 is anchored by a yoke 77 to the pivot pin 17 that connects the front and rear gangs 10 and 11. A conduit 78 is connected at its rear end to the cylinder 71 and serves to conduct fluid under pressure to the cylinder and piston unit 70. The latter is arranged so that when fluid is forced into the cylinder 71, the piston and piston rod moves outwardly, swinging the toggle links 41 and 42 into the positions shown in Figure 5, thus forcing the gangs 10 and 11 into a straightened position. The conduit 78 is connected at its forward end to the hydraulic unit V on the tractor so as to controllably derive operating energy from the tractor.

When the gangs 10 and 11 are in their angled position, as shown in Figure 1, it is frequently difficult, if not impossible, to make a right turn with the outfit if the gangs are left in their angled position. According to the principles of the present invention, I provide controlling means whereby the power unit 70 is automatically operated whenever the tractor turns to the right for momentarily de-angling the gangs, forcing them into a straightened position, or even beyond, if desired, thereby facilitating the making of the right turn. Referring now more particularly to Figures 1 and 2, a bell crank 90 is mounted for rocking movement on a bracket 91 carried by the tractor drawbar 5, or some other part of the tractor. One arm 93 of the bell crank 90 is connected by a link 92 to the valve lever 6, and the other arm 94 of the bell crank 90 is pivotally connected to the forward end of a generally rearwardly extending link 95. The rear end of the latter is slidable through a trunnion 96 swingably mounted on the hitch bar 21, as best shown in Figure 1. The link 95 extends rearwardly of the trunnion 96 and carries two springs 97 and 98 in front of and in rear of the trunnion 96, respectively. Set screw collars 101 and 102 limit the positions of the springs 97 and 98.

The operation of the implement as described above is substantially as follows:

When the operator desires to make a right turn and so turns the tractor, the angular displacement of the latter to the right pulls forwardly on the link 95, which motion is resisted by the spring 98, and this rearward relative movement of the link 95 serves to swing the bell crank 90 in a clockwise direction (Figure 2), thus raising the valve lever 6 from its lower position into its upper position (dotted lines, Figure 2). The movement of the valve lever from lowered position to raised position, serves to cause fluid under pressure to be delivered through the conduit 78 into the cylinder 71. This causes the piston 72 and piston rod 73 to move outwardly, thus swinging the toggle links 41 and 42 into their collapsed position (Figure 5), which swings the gangs 10 and 11 into a de-angled or straightened position. This operation is, of course, entirely automatic so far as the operator is concerned, and any excess motion of the link 95 beyond that required to operate the valve 6 is absorbed by the spring 98. After the right turn is completed, the tractor moves, relative to the harrow 1, back in to the position shown in dotted lines, in which position the spring 97 serves to return the valve lever 6 to its lower position, which serves to release the fluid in the cylinder 71, which permits the spring 44 and the soil resistance acting against the gangs to return the latter to their operating or angled position, forcing the fluid forwardly through the conduit 78 into the sump or reservoir which forms a part of the valve mechanism V. It will be observed that the de-angling of the gangs in order to make a turn occurs at a relatively rapid rate and is dependent only upon the angular swinging of the tractor relative to the harrow to a predetermined degree. This angle, once attained, causes an almost immediate de-angling of the gangs, independent of any further swinging of the tractor relative to the harrow. The angle of the tractor relative to the harrow, at which de-angling is initiated, may be adjusted by setting the set screw collars 101 and 102 at different positions along the link 95. In thus deriving operating energy from the tractor for de-angling the gangs, the desired de-angling may be done rapidly. Any suitable mechanism may be provided for holding the gangs in a straightened position for purposes of transport.

A modified form of the invention is shown in Figure 4, in which the hydraulic cylinder and piston unit is mounted, not on the harrow as in Figure 1, but on the tractor. In this form of the invention, the rear toggle link 41a is provided with an extension 111 to which a flexible cable or similar element 112 is connected. The cable 112 passes around a sheave 113 on the pivot 17a and then between a pair of guide rollers 114 mounted on the rear frame bar of the front gang frame and is extended forwardly through a guide ring 115 carried by the pivot that connects the hitch to the drawbar 117 of the tractor. In this form of the invention, the drawbar 117 preferably is larger than the form shown in Figure 1, and is of generally U-shaped construction, the forward ends of which are disposed below the rear axle extensions 118 and 119 (Figure 4) and are fastened thereto by any suitable means, such as pairs of vertical angles 121 bolted at their upper ends to the tractor rear axle. A cylinder and piston unit 126 is anchored to a bracket 128 that is fixed to the tractor drawbar 117, and the front end of the cable 112 is connected to the piston rod 129 of the unit 126. In the latter, fluid is admitted behind the piston 131 by means of a conduit 132. The conduit 132 extends to the valve mechanism on the tractor, which is of the same construction as described above. Likewise, the de-angling control linkage, controlling the operation of the valve lever, is the same in this form of the invention as shown in Figure 1, and hence these parts are indicated by the same reference numerals.

The hydraulic power cylinder and piston unit 126 is arranged on the tractor so that, at about the point where in the turning of the tractor to the right it is desired to de-angle the gangs, the axis of the cylinder lines up with the guide ring 115 and the guide rollers 114, whereby the pull on the cable 112 is substantially in a straight line. This reduces the wear on the guide ring 115.

The operation of this form of the invention is substantially as follows. When the tractor makes a right turn through a predetermined angle relative to the harrow, the valve lever is raised, which directs fluid under pressure into the cylinder and piston unit 126. This pressure forces the piston 131 forwardly, exerting a pull through the cable 112 against the toggle link extension or arm 111. This pull swings the toggle links into a position corresponding to that shown in full lines in Figure 5, thus forcing the gangs into a de-angled position, facilitating the making of the right turn. As soon as the right turn is completed and the tractor swings back into a normal position, the hydraulic pressure in the unit 126 is released, and the gangs moved back into their normal operating position again.

While I have shown and described above the preferred structure in which the principles of the present invention have been incorporated, it is to be understood that my invention is not to be limited to disk harrows or disk harrows of the offset type, but that other implements and machines may be controlled by the turning of the tractor or other draft means and that, in fact, widely different means may be employed in the practice of the broader aspects of my invention.

What I claim, therefore, and desire to secure by Letters Patent is:

1. In combination, an implement comprising a tool, draft means for drawing said tool and including a source of energy, means for holding said tool in one position, power operated means for moving said holding means, and means responsive to turning of said draft means relative to said implement for causing a flow of power from said source of energy to said power operated means.

2. In combination, a propelling vehicle, a vehicle to be propelled thereby turnably connected with said propelling vehicle, one of said vehicles having a source of power and the other of said vehicles having a part to be operated by said source of power, and means responsive to turning of the propelling vehicle relative to the other for causing a flow of power from said source to said part for operating the latter.

3. In combination, a propelling vehicle, a vehicle to be propelled thereby turnably connected with said propelling vehicle, a source of power on the propelling vehicle, means on the propelled vehicle to be operated from said source of power, and means responsive to turning of the propelling vehicle relative to the other for causing a flow of power from said source to said means.

4. An offset disk harrow adapted to be propelled by a tractor having a source of pressure, comprising front and rear gangs pivotally connected together for movement between angled and straightened positions, a hydraulic cylinder and piston unit mounted on the tractor and connected with said gangs for shifting them from one position to another, controllable connections between said hydraulic cylinder and piston unit and said source of pressure on the tractor, and means responsive to the turning of the tractor in one direction for operating said connections so as to cause said unit to move said gangs into a corresponding position.

5. The combination of a motor operated drawing vehicle, a drawn vehicle pivotally connected in draft transmitting relation to the drawing vehicle and including tool means adapted to be moved into different positions, a hydraulic cylinder and piston unit on one of said vehicles and operatively connected with said tool means for shifting the latter from one position to another, said drawing vehicle having a source of pressure thereon, control means controlling the transmission of fluid under pressure from said source to said unit for shifting said tool means, and means responsive to angular displacement between said vehicles for actuating said control means to cause said power unit to adjust said tool means.

6. The combination of a motor operated drawing vehicle, a drawn vehicle pivotally connected in draft transmitting relation to the drawing vehicle and including ground working tool means adapted to be moved into different positions, a hydraulic cylinder and piston unit carried by the drawing vehicle and operatively connected with said tool means for shifting the latter from one position to another, said drawing vehicle having a source of pressure thereon, control means controlling the transmission of fluid under pressure from said source to said unit for shifting said tool means, and means responsive to angular displacement between said vehicles for actuating said control means to cause said power unit to adjust said tool means.

7. The combination of a motor operated drawing vehicle, a drawn vehicle pivotally connected in draft transmitting relation to the drawing vehicle and including ground working tool means adapted to be moved into different positions, a hydraulic cylinder and piston unit on the drawn vehicle and operatively connected with said tool means for shifting the latter from one position to another, said drawing vehicle having a source of pressure thereon, control means controlling the transmission of fluid under pressure from said source to said unit for shifting said tool means, and means responsive to angular displacement between said vehicles for actuating said control means to cause said power unit to adjust said tool means.

8. A tractor disk harrow adapted to be propelled by a tractor having a source of hydraulic pressure thereon, comprising front and rear gangs pivotally connected together, a cylinder and piston unit operatively connected with said gangs for shifting the position thereof, a valve controlled pressure line adapted to be connected with and extend from said source of pressure to said cylinder and piston unit, and means responsive to turning of the tractor relative to the harrow for operating said valve so as to change the position of the gangs when the tractor is turned.

9. In combination, a tractor, a power unit, an offset disk harrow comprising front and rear gangs connected to one another for relative movement and to the tractor, means connecting said power unit with the gangs so that operation of said power unit shifts the gangs relative to each other into a position to accommodate turning of the tractor relative to the gangs in one direction, and means responsive to the turning of the tractor by a predetermined amount in said one direction relative to the gangs for operating said power unit to cause the latter to shift said gangs into said position.

10. A tractor propelled disk harrow comprising a pair of disk gangs connected for relative horizontal angular movement, a pair of toggle links connected, respectively, with said gangs for controlling the angular position of one with respect to the other, a hydraulic cylinder and piston unit operatively connected wtih said toggle links for changing the angular relation between said gangs, a source of hydraulic pressure on the tractor for operating said hydraulic cylinder and piston unit, and means responsive to the turning of the tractor relative to the harrow for controlling the application of hydraulic pressure to said unit.

11. A tractor propelled disk harrow comprising a pair of disk gangs connected for relative horizontal angular movement, a pair of toggle links connected, respectively, with said gangs for controlling the angular position of one with respect to the other, a hydraulic cylinder and piston unit operatively connected with said toggle links for changing the angular relation between said gangs, a source of hydraulic pressure on the tractor for operating said hydraulic cylinder and piston unit, valve means controlling the application of hydraulic pressure from said source to said hydraulic cylinder and piston unit, and means responsive to the turning of the tractor relative to the harrow for operating said valve means.

12. A tractor propelled offset disk harrow comprising a pair of disk gangs connected for relative angular displacement, connecting means between said gangs for controlling the angular position thereof, a hydraulic cylinder and piston unit mounted on the tractor and operatively connected with said connecting means for controlling the angular position of said gangs, a source of power for said cylinder and piston unit, and means responsive to turning of the tractor relative to the harrow for controlling the application of power from said source to said hydraulic cylinder and piston unit.

13. A tractor propelled disk harrow comprising a pair of disk gangs connected for relative angular movement, means acting against said gangs for changing the angle therebetween, means deriving power from the tractor for operating said angle changing means, and means connected between the tractor and the harrow and responsive to turning of the tractor relative to the harrow for controlling said angle changing operating means.

14. A disk harrow comprising a pair of disk gangs connected for relative horizontal angular movement into and out of positions in which the gangs are angled apart at one side of the harrow, angle control means connected with said gangs for controlling the movement of said gangs into and out of said angled position, power operated means connected with said angle control means for deangling said gangs, a draft connection swingably connected with the forward portion of the harrow, and means responsive to turning of said draft connection relative to the harrow toward said one side thereof for causing said power operated means to deangle said gangs.

15. An implement adapted to be propelled by a tractor having a source of fluid pressure thereon, said implement having two parts mounted for movement one relative to the other, a hydraulic cylinder and piston unit connected with said parts for moving them, controllable connections from said hydraulic unit to said source of pressure on the tractor, and means responsive to turning of the tractor in one direction relative to said implement for actuating said connections so as to move said parts toward one position by the turning of the tractor in one direction relative thereto.

16. A tractor propelled disk harrow comprising a pair of disk gangs conected for relative horizontal angular movement, a hydraulic cylinder and piston unit operatively connected with said gangs for changing the angular relation therebetween, a source of hydraulic pressure on the tractor for operating said hydraulic cylinder and piston unit, and means responsive to the turning of the tractor relative to the harrow for controlling the application of hydraulic pressure to said unit.

17. A tractor propelled disk harrow comprising a pair of disk gangs connected for relative horizontal angular movement, a hydraulic cylinder and piston unit operatively connected with said gangs for changing the angular relation therebetween, a source of hydraulic pressure on the tractor for operating said hydraulic cylinder and piston unit, valve means controlling the application of hydraulic pressure from said source to said hydraulic cylinder and piston unit, and means responsive to the turning of the tractor relative to the harrow for operating said valve means.

THOMAS M. THOMAS.